May 2, 1961 J. MARTIN 2,982,502
HOODS AND SEAT EJECTING MECHANISM ON AIRCRAFT
Filed April 12, 1957 5 Sheets-Sheet 1
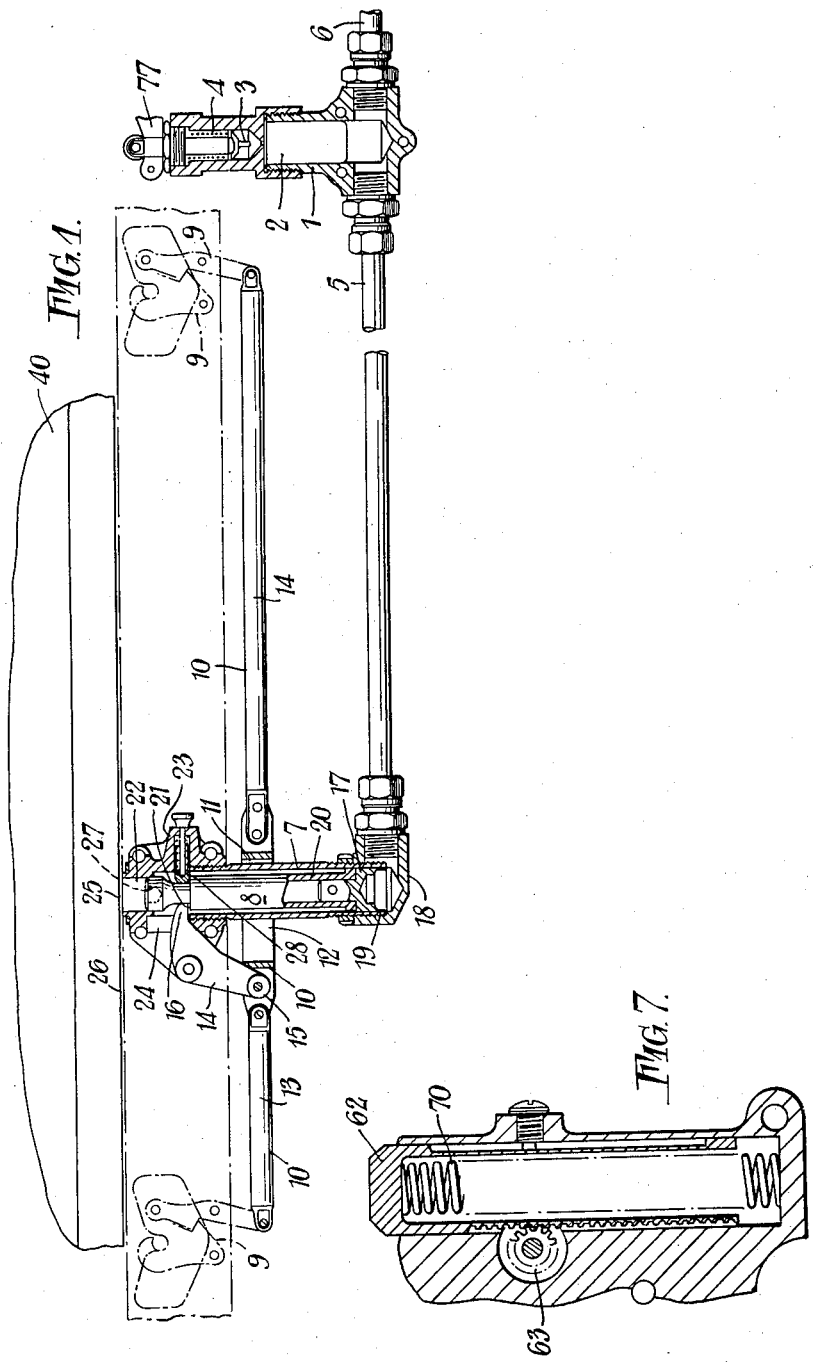

May 2, 1961  J. MARTIN  2,982,502
HOODS AND SEAT EJECTING MECHANISM ON AIRCRAFT
Filed April 12, 1957  5 Sheets-Sheet 2

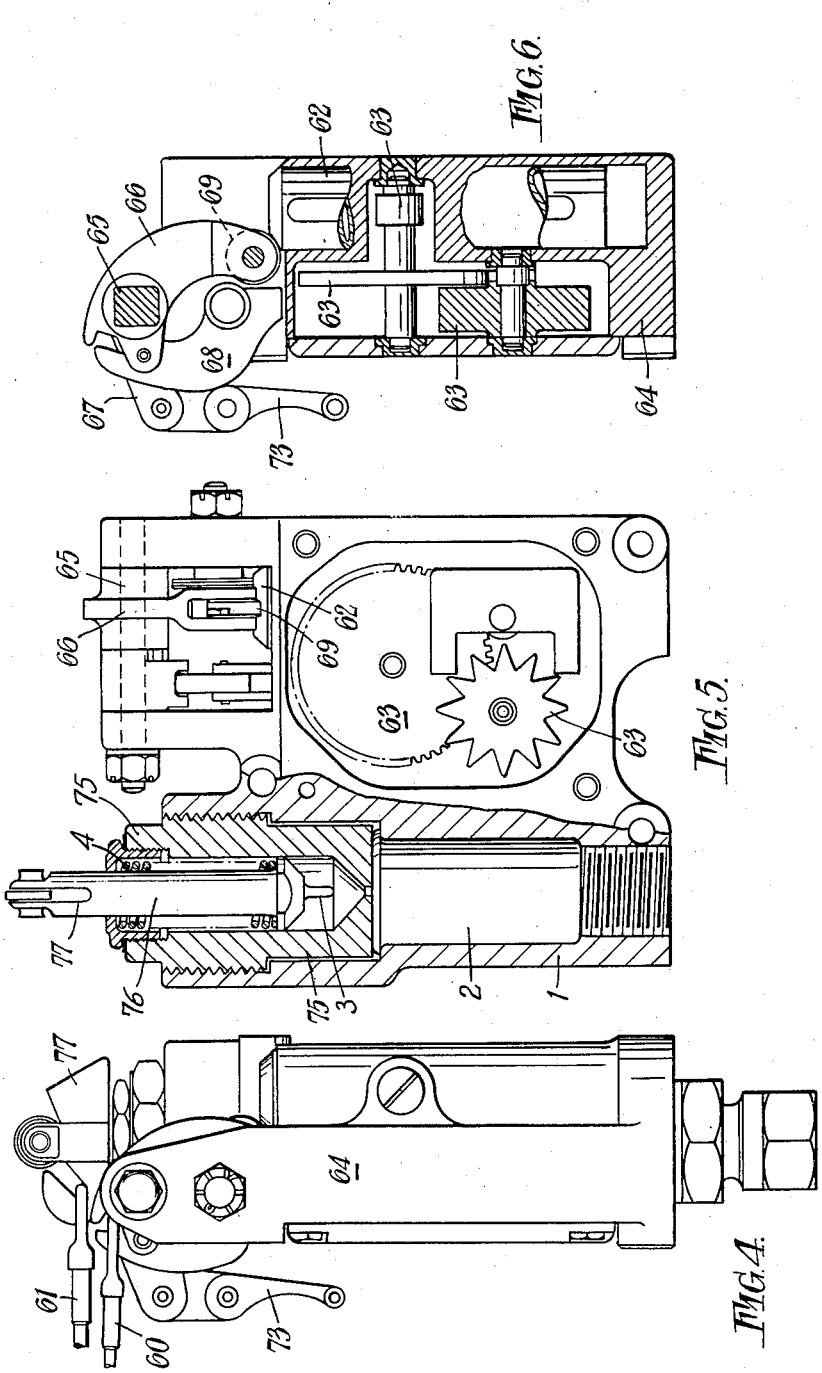

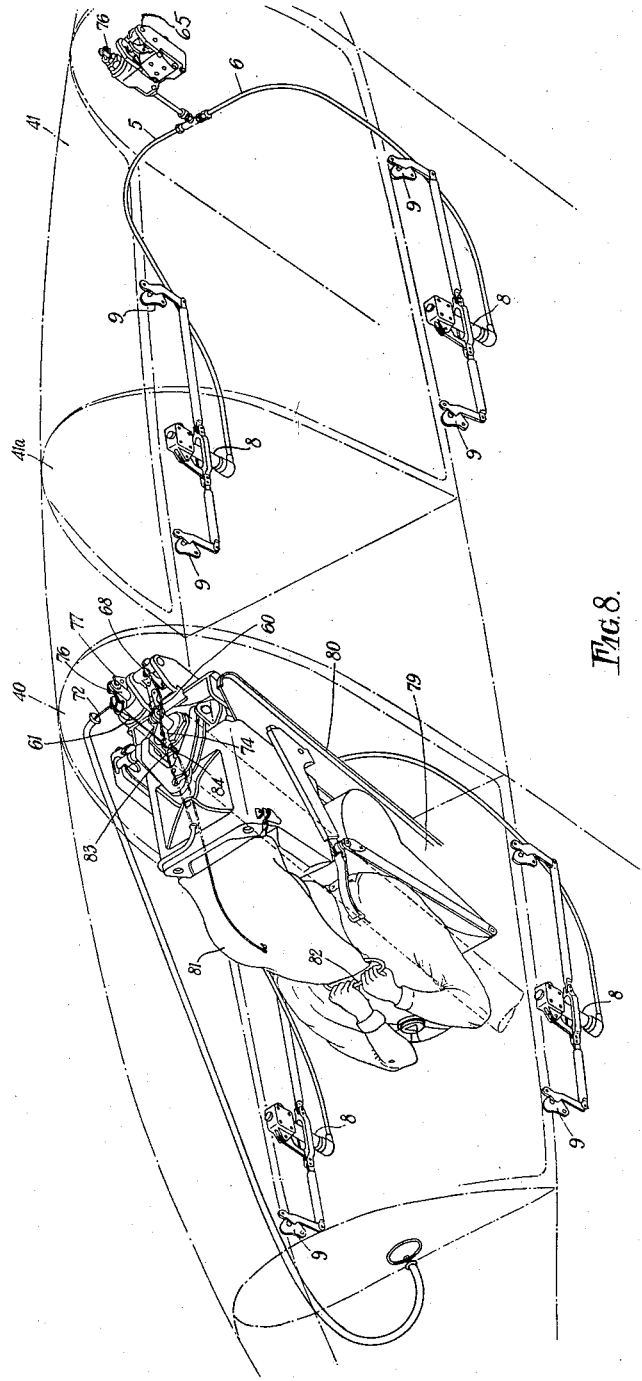

United States Patent Office 2,982,502
Patented May 2, 1961

2,982,502

HOODS AND SEAT EJECTING MECHANISM ON AIRCRAFT

James Martin, Denham, near Uxbridge, England (Southlands Manor, Southlands Road, Middlesex, England)

Filed Apr. 12, 1957, Ser. No. 652,432

5 Claims. (Cl. 244—122)

This invention relates in general to ejection mechanism for aircraft and in particular to means for the sequential discharge of a cockpit hood and of a personnel ejection seat from an airplane.

This application is a continuation-in-part of my prior application, Ser. No. 501,685 filed April 15, 1955, now Patent No. 2,937,829 for Hoods or Canopies of Aircraft. The term "airman" as used in this application means a pilot, passenger or other occupant of the aircraft.

The present method of jettisoning the hood from an airplane consists only of means for releasing locks which hold the hood to the craft but do not include means for positive discharge of the unlocked hood from the aircraft. The prior devices have relied upon aerodynamic forces to suck off the hood but in certain conditions of flight, as in inverted spin, these forces may in fact tend to hold the hood firmly in position even after it is unlocked. When it is necessary for the airman also to eject his seat the hood must be discharged or jettisoned first and any delay in removing the hood will endanger the airman.

It is a general object of the invention to provide means for first jettisoning the hood, and thereafter ejecting the seat without undue time lag.

A further object is to provide mechanism which avoids the necessity of the airman having to push off the hood manually before ejection of his seat.

Other objects of the invention will in part be obvious and will in part appear hereinafter.

In my parent application Ser. No. 501,685 I disclosed for the first time the combination of two fluid generating means one of which was used for jettisoning the hood and the other for ejecting an airman's seat, the fluid generating means being actuated by a single control means attached to a face screen or blind and a time delay mechanism disposed between the control and the seat ejection means so that the hood was released and discharged first and the seat then ejected.

The single control means is preferably actuated by movement of a face blind or screen adapted to be drawn into position over the face of the occupant of the ejection seat and simultaneously actuate the hood and seat discharge mechanism in sequence. The present invention also provides means by which the airman may jettison the hood only but not the seat by use of a separate hand control preferably mounted in a convenient position on the seat or adjacent the seat.

For a more detailed description of the invention reference should be had to the accompanying drawings in which Fig. 1 is a side elevation, partly in section, of one embodiment of means for releasing and jettisoning a hood.

Fig. 4 is a side elevation of the combined firing unit and time delay mechanism.

Fig. 5 is a side elevation of the mechanism shown in Fig. 4 partly in section and with cover plate removed.

Fig. 6 is a side elevation partly in section of the mechanism shown in Fig. 4.

Fig. 7 is a side elevation, chiefly in section of a rack component of the time delay means, and Fig. 8 is a diagrammatic perspective view showing the entire mechanism applied to an aircraft having a hood and an airman's seat.

Figure 2:
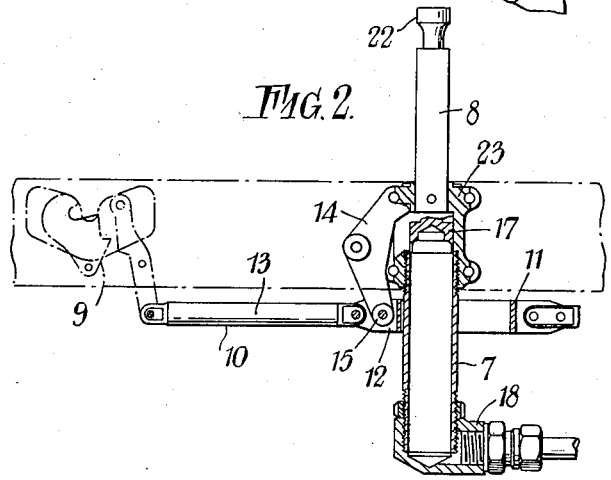
Fig. 2 is a side elevation, partly in section, of the means shown in Fig. 1 after the hood has been jettisoned.

Referring now to Figs. 1, 2 and 8 the mechanism for releasing and jettisoning the hood will be described. The firing unit for this mechanism comprises a breech 1 containing an explosive cartridge 2, a firing pin 3 with a sear 77 positioned in a slot in its upper end a spring 4 serving to urge the firing pin towards the cap of cartridge. Instead of a sear any other conventional means may be used for locking and releasing the firing pin.

Leading from the breech 1 are pipe lines 5 and 6, the other ends of which are coupled to cylinders 7 in which work jack pistons 8. The pressure of the gases generated by the firing of the cartridge 2 flows along these pipe lines to the interior of the cylinders 7 and forces the pistons 8 upward. This firing unit is common to all the cylinders 7 and pistons 8 therein.

The cockpit hood or canopy 40 is secured to the aircraft by suitable latch locks 9, preferably four locks positioned so that one is at each of the four corners of the hood. The two locks 9 on one side are connected through rods 11, 13 and 14 to one of the cylinders 7 and the two locks one the other side of the hood are connected in a similar manner to the other cylinder 7. The rods 11, 13 and 14 are components of a general connecting link 10 between the locks and the cylinder. The central component 11 is provided with a slot 12 through which the cylinder 7 extends, and the outer ends of the rods 13 and 14 are pivoted to the latch locks 9 as shown in Fig. 1.

Figures 10, 11:
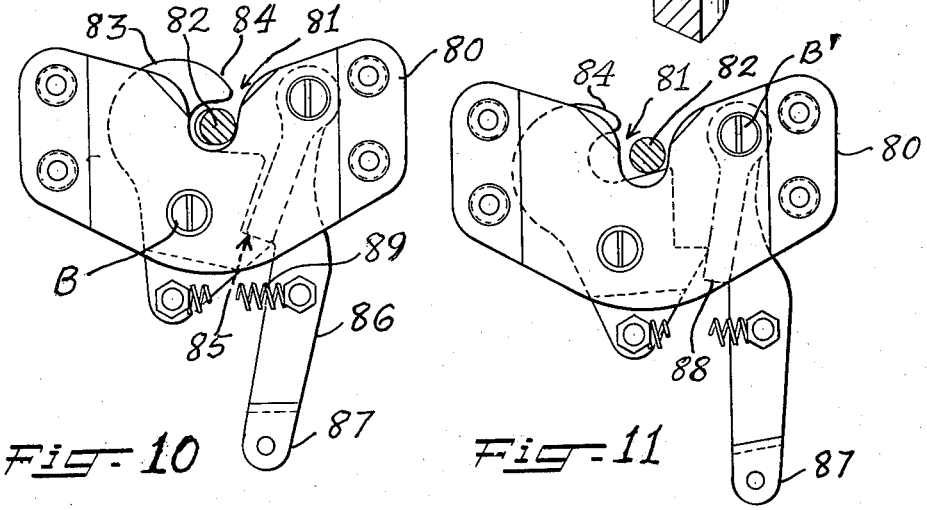
Fig. 10 is an enlarged side elevation of the hood latch shown in closed position.
Fig. 11 is a view of the latch of Fig. 10 in open position.

The construction of the latches shown in Figs. 1 and 2 is shown in more detail in Figs. 10 and 11. In Fig. 10 the latch is shown in closed position and comprises a plate 80 attached to the top edge of the cockpit and having a central depression 81 in the top edge to accommodate a pin 82 which is fixed to and projects from the hood rail 26. A lever 83 is pivotally mounted by bolt B to the plate 80, and the lever has a hook 84 on its upper end that normally covers the pin 82 and has a ledge 85 on one side. A second lever 86 is pivotally mounted at its top end by bolt B' to the plate 80 and its lower end 87 is pivoted to the end of the shaft 10 (see Fig. 1). The second lever is provided with a projection 88 that normally seats on the ledge 85 of the lever 83. The two levers are connected by a spring 89. Then the shaft 10 is moved toward the right by the action of the fluid pressure generated by the hood firing mechanism, the projection 88 or lever 86 slides off the ledge 85 whereupon the lever 83 moves toward the left as shown in Fig. 11 so that the pin 82 is now free to move upward so that the hood may be jettisoned by the jack pistons.

Adjacent each cylinder 7 is a pivoted catch 14 having one end pivoted to the link 10 and the end serving as a pawl 16 which rests on a shoulder 21 of the piston rod 20. The shouldered end of the piston 20 flares upwardly to form the piston head 22 which is positioned to contact the lower rail 26 of the hood 40 when the piston is forced upwardly. The shouldered part and the head of the piston are housed within a bracket-like fitting 23 secured by a union screw to the cylinder 7, the pivoted catch 24 moving through a slot 24 in the fitting. The piston head 22 is positioned in the cylindrical space 27 but normally rests below the lower edge 25 of the hood rail 26. The jack piston is held in position against forces set up by negative G by suitable means such as a spring-loaded plunger 28 housed within the fitting 23 and bearing against the piston, as shown in Fig. 1.

The jack piston 8 is provided with a lower cupped end 17 having a thin wall 19 to permit expansion sealing under pressure of the gases from the firing unit which flow through the line 5 into the cylinder 7 through the union 18.

The operation of the above-described mechanism to jettison the hood is as follows: Gas pressure is generated in the breech 1 of the firing unit by means of an explosive cartridge 2 which is fired by the airman either manually or by suitable automatic means. The gas pressure passes along the pipe lines 5 and 6 to the cylinders 7 positioned on each side of the cockpit and actuates the jack pistons 8 therein to move upwardly. During the first part of this movement the shoulder 21 on the piston 8 presses upwardly against the pawl 16 which swings the catch 14 about its pivot. The catch thus imparts longitudinal movement to the connecting link 10 which results in the release of the latch locks 9 to free the hood. Upon the continued upward movement of the jack pistons 8 the piston head 22 contacts the lower edge 25 of the hood rail 26 so that the hood 40 is next jettisoned in a positive manner. To summarize, the pistons 8 first release the hood locks and then jettison the released hood. Fig. 1 shows the hood jettisoning mechanism in normal position and Fig. 2 shows the parts after the hood has been released and jettisoned.

This hood release and jettisoning mechanism is claimed per se in my parent application Ser. No. 501,685 and may be used in aircraft not having ejection seats. It is to be understood that in the combination claimed in the present application the mechanism described in Figs. 1 and 2 may be replaced or varied by use of the mechanism for jettisoning hoods as shown in Figs. 4, 5, 6, 7 and 13 of my parent application without transcending the scope of the present invention claimed in this application.

In the present application the mechanism for releasing and jettisoning a hood is to be used in combination with a second firing unit for ejecting an airman's ejection seat after the hood has been jettisoned. This combination is illustrated in Figs. 3, 4, 5, 6, 7 and 8, in which the firing of the hood jettisoning gun is first and the firing of the ejection seat gun follows in sequence after a short time delay.

For the purpose of operating the combination of the hood jettison mechanism in sequence with the ejection seat it is desirable that a single movement by the airman should be sufficient. In the combination illustrated this is effected by the use of a face screen or blind 81.

Figure 9:
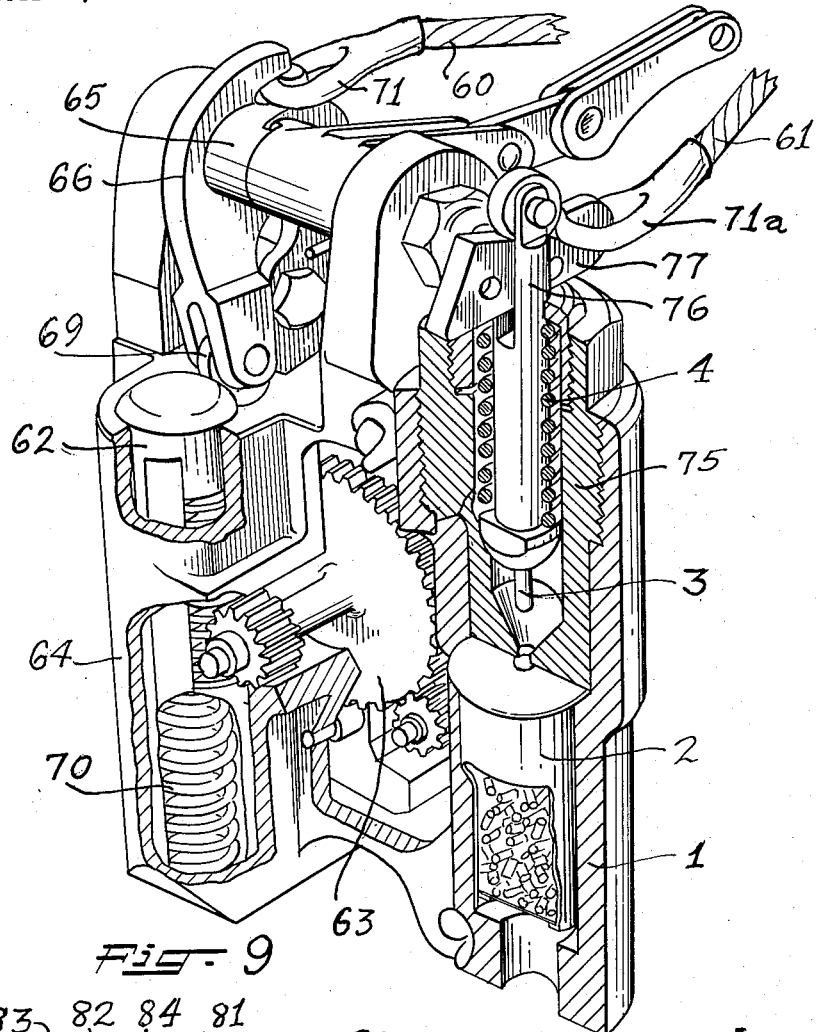
Fig. 9 is a perspective view, partly in section, of the time delay mechanism and the seat firing mechanism.

The general relationship of the components of the combination is shown in Fig. 8 in which there is illustrated a cockpit of an aircraft having an ejection seat 79 therein in which the airman sits. The combined firing units are attached to the back of the seat frame 80. There is also provided a firing control comprising a face screen or blind 81 normally contained in a housing behind the airman's head, the screen or blind having a hand grip 82 on the free end and the other end being attached to a cable 83 passing through a tube 84, the cable having two branches, branch 61 being used for firing the hood jettisoning firing unit and cable 60 adapted to actuate the firing unit 38 for ejecting the seat 79. The time delay mechanism for the seat ejection unit comprises a spring loaded tubular rack 62 shown in Fig. 6 and in Fig. 9 in engagement with a train of gears forming an escapement generally indicated by reference numeral 63, the whole being contained within a housing 64 surmounted by a torque shaft 65 being two levers 66 and 67. A third lever 68 pivoted directly below the torque shaft 65 serves as a trip lever, the end of the torque shaft 65 being suitably slotted to accommodate a cocking tool.

This time-delay mechanism is of the type shown in my prior U.S. Patent 2,708,083, see Figures 4 to 7.

To cock the mechanism an appropriate tool is introduced into the slot in the torque shaft and turned clockwise, whereby the roller 69 at the end of lever 66 bears down on the rack barrel 62 compressing the spring 70 (see Fig. 7) until the roller 69 reaches the position shown in Fig. 6 where it is retained by the effect thrust of the rack. In the last part of this movement the roller 69 comes in contact with the heel of the trip lever 68, causing this lever to assume an erect position and to trap the eye-end 71 of the trip cable 60 against the upper part of the lever 66. In this position the articulated link 73 composed of two pivotally connected sections may be engaged with the sear 74 of the seat firing pin 38. Adjacent the time delay mechanism and integral with the housing 64 is a breech mechanism comprising a firing body 75 having a firing pin 2 operated by the withdrawal of a sear 77 and engaging this sear is the other eye-end 71a of the trip cable 61.

Figure 3:
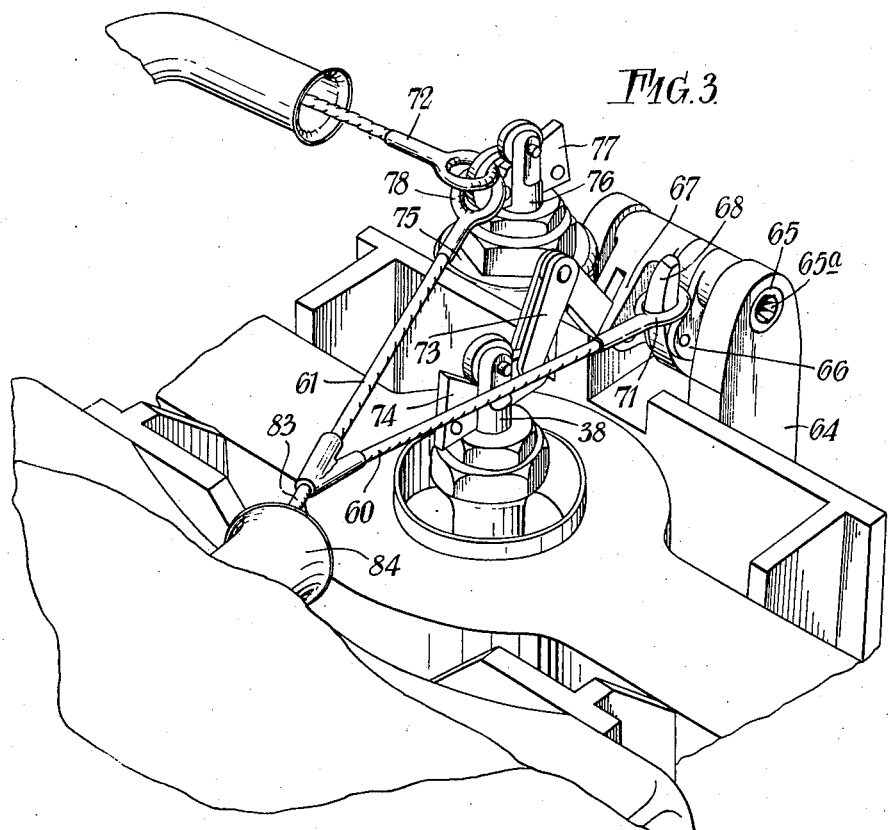
Fig. 3 is a perspective view of a combined firing unit for both hood and seat with single control means therefor and with manual control means for the hood alone.

In the fully cocked condition the mechanism is as shown in Fig. 3 and this is the normal condition during flight. The sequence of operation when the seat is ejected from an aircraft is as follows:

When the airman pulls on the hand grip 82 as shown in Fig. 8 thus drawing the blind or screen 81 over his face, the cable 83 with its branches 60 and 61 are simultaneously drawn forward. The cable 61 thus withdraws the sear 77 and the firing pin 3 fires the cartridge 2 immediately so that the hood 40 is released and jettisoned. Simultaneously the cable 60 actuates the time delay mechanism in a manner reverse to that used in cocking it. The cable 60 pulls the lever 68 forward and the heel of this lever forces the roller 69 up away from the rack 62 and thus permits the rack 62 to rise as shown in Fig. 7. When this happens the movement of the lever 66 is transmitted by the torque shaft 65 to lever 67 which, through the articulated link 73, withdraws the sear 74 of the seat firing pin 38 which then ejects the seat. The time delay mechanism requires about 1–1½ seconds to actuate the seat firing gun so that, by the end of this interval, the hood has completely cleared the ejection path of the seat. Where it is desired only to jettison the hood and not to eject the seat a third cable 72, or some other suitable means, is connected to the hood jettison sear 77. The other end of the cable 72 may be provided with a loop or handle (not shown) mounted at some convenient position adjacent the airman.

It will be apparent that the invention can be variously modified and changed within the scope of the appended claims.

What I claim is:

1. In an aircraft having a cock-pit, the combination of, a releasable hood over said cockpit, an airman's ejection seat disposed in said cockpit under said hood, latches releasably holding said hood on said cockpit, means for releasing said latches, a first fluid generating means for actuating said latch release means, a seat ejecting mechanism, a second fluid generating means for actuating said ejection mechanism, a single control means connected to each of said fluid generating means and a time delay mechanism disposed between said control means and said second fluid generating means so that actuating said single control means first causes said hood to be released and jettisoned and thereafter causes said airman's seat to be ejected.

2. A combination as recited in claim 1, in which the single control means comprises a cable having one end adapted to be controlled by the airman in said seat and the other end comprising two branches, one branch being attached to said first fluid generating means and the other branch being attached to said time delay mechanism.

3. A combination as recited in claim 1, in which the single control means comprises a screen adapted to be drawn over the face of an airman seated in said seat and a cable having one end adapted to be controlled by the airman in said seat, said end being fixed to said screen, the other end of said cable comprising two branches, one branch being attached to actuate said first fluid generating means and the other being attached to actuate said time delay means.

4. A combination as recited in claim 1 in which said first fluid generating means and said time delay means are located within a common housing.

5. In an aircraft having a cockpit, the combination of a releasable hood over said cockpit; an airman's ejection seat disposed in said cockpit under said hood; latches releasably holding said hood on said cockpit; means for releasing said latches; a first fluid generating means for operating said latch-release means; a seat ejection mechanism; a second fluid generating means for actuating said seat ejection mechanism; time delay means comprising a spring urged rack, a torque shaft, a first lever keyed to such shaft for locking said rack, a train of gears positioned to be operated by said rack during movement of said rack after it has been freed by said first lever, and a second lever keyed to said shaft and arranged to be operated by said rack, such second lever being attached to actuate said second fluid generating means; and a single control means comprising a cable having one end adapted to be controlled by an airman in said seat and the other end comprising two branches one of which is attached to actuate said first fluid generating means and the other of which is attached to actuate said first lever of said time delay means.

References Cited in the file of this patent

UNITED STATES PATENTS

| | | |
|---|---|---|
| 2,479,713 | Beach | Aug. 23, 1949 |
| 2,709,556 | Jandris | May 31, 1955 |
| 2,820,602 | Foster | Jan. 21, 1958 |

FOREIGN PATENTS

| | | |
|---|---|---|
| 624,143 | Great Britain | May 27, 1949 |
| 748,956 | Great Britain | May 16, 1956 |
| 754,100 | Great Britain | Aug. 1, 1956 |
| 761,627 | Great Britain | Nov. 14, 1956 |